(12) United States Patent
Miyata et al.

(10) Patent No.: US 6,870,972 B2
(45) Date of Patent: Mar. 22, 2005

(54) CONNECTING METHOD OF OPTICAL DEVICES, AND OPTICAL APPARATUS

(75) Inventors: Hideyuki Miyata, Kawasaki (JP); Yoshihiko Kaitoh, Sapporo (JP); Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 16 days.

(21) Appl. No.: 10/106,327

(22) Filed: Mar. 27, 2002

(65) Prior Publication Data

US 2003/0123777 A1 Jul. 3, 2003

(30) Foreign Application Priority Data

Dec. 28, 2001 (JP) ........................................ 2001-399238

(51) Int. Cl.[7] .............................................. G02B 6/00
(52) U.S. Cl. ............................ 385/11; 385/27; 359/483
(58) Field of Search ....................... 385/11, 27; 359/483

(56) References Cited

U.S. PATENT DOCUMENTS

| | | | |
|---|---|---|---|
| 4,146,297 A | | 3/1979 | Alferness et al. ........ 350/96.14 |
| 5,187,757 A | * | 2/1993 | Ohno et al. .................... 385/11 |
| 5,218,653 A | | 6/1993 | Johnson et al. |
| 5,355,237 A | * | 10/1994 | Lang et al. ..................... 385/14 |
| 5,357,359 A | * | 10/1994 | Uchiyama et al. ............. 398/75 |
| 5,652,809 A | | 7/1997 | Aronson |
| 5,850,492 A | | 12/1998 | Morasca et al. |
| 5,911,015 A | | 6/1999 | Bigo .............................. 385/1 |
| 6,061,481 A | | 5/2000 | Heidrich et al. ............... 385/14 |
| 2001/0012421 A1 | | 8/2001 | Tanaka et al. ................. 385/11 |
| 2004/0047583 A1 | * | 3/2004 | Chiba et al. ................. 385/140 |

FOREIGN PATENT DOCUMENTS

| | | |
|---|---|---|
| EP | 1085622 | 3/2001 |
| EP | 1107488 | 6/2001 |
| JP | 08-114776 | 5/1996 |
| JP | 08-211349 | 8/1996 |
| JP | 08-286160 | 11/1996 |
| JP | 09-090303 | 4/1997 |
| JP | 11-064809 | 3/1999 |

* cited by examiner

*Primary Examiner*—Rodney Bovernick
*Assistant Examiner*—Sung Pak
(74) *Attorney, Agent, or Firm*—Staas & Halsey LLP

(57) ABSTRACT

The present invention aims at providing a connecting method of optical devices capable of suppressing a periodic wavelength dependence loss and the like, due to the inter-polarization-mode interference caused when connecting a plurality of optical devices by using an optical path having a polarization-preserving characteristic, and an optical apparatus applied with the connecting method. To this end, the connecting method according to the present invention, is to connect a plurality of optical devices to one another by using an optical path of polarization-preserving type having optical characteristics in which a light is propagated along two different polarization axes for substantially equal distances. Thus, even if the polarization direction of the light input/output to/from the respective optical devices is not completely coincident with the direction of the polarization axis of the optical path, it is possible to offset the periodic wavelength dependence loss and the like caused by the inter-polarization-mode interference in the optical path, to be suppressed.

42 Claims, 9 Drawing Sheets

| PROPAGATION DIRECTION OF LIGHT AND SAW | WAVELENGTH Λ OF SAW SENSED BY LIGHT |
|---|---|
| STATIC (ACOUSTIC VELOCITY = 0) | Λ₀ — PROPAGATION DIRECTION OF LIGHT |
| FORWARD DIRECTION | Λ₊ — PROPAGATION DIRECTION OF SAW |
| REVERSE DIRECTION | Λ₋ — PROPAGATION DIRECTION OF SAW |

$\Delta\lambda$

REVERSE DIRECTION   STATIC   FORWARD DIRECTION $\lambda_-$   $\lambda_0$   $\lambda_+$

SELECTED WAVELENGTH

DIAGRAM EXPLAINING PERIODIC WAVELENGTH
DEPENDENCE LOSS IN CONVENTIONAL CONNECTING METHOD

CONNECTING METHOD OF OPTICAL DEVICES, AND OPTICAL APPARATUS

BACKGROUND OF THE INVENTION (1) Field of the Invention

The present invention relates to a technique for connecting a plurality of optical devices, in particular, to a method for connecting respective optical devices using optical paths having polarization-preserving characteristics, and an optical apparatus applied with the method.

(2) Related Art

There have been demanded developments of optical communication systems and optical signal processing systems capable of constructing networks of large capacities and ultra-long distance with an explosive increase of IP data communication demand. In a transmission system adopting a wavelength-division multiplexing (WDM) transmission as a basic technique thereof, it is possible to realize the large capacity transmission and easily perform the division-multiplication with the wavelength as a unit, so that the construction of flexible optical networks that performs multiplication-division of different kinds of services at optical levels, such as, optical cross-connecting (OXC), optical add/drop multiplexing (OADM) and the like. Therefore, the development and manufacturing of transmission apparatus and signal processing apparatus using the above system have been remarkably made.

In these apparatuses, there are utilized many optical devices, such as, an optical switch having functions for switching ON/OFF of light, for attenuating the light, for switching to 1×n, or the like, a wavelength filter that separates a signal light for each wavelength, or the like. Specifically, the optical switch (including an attenuator) is used, for example, for adjusting the levels of respective wavelengths at a wavelength division multiplexing section on the sending side, for ALC controlling by an optical amplifier, for wavelength switching in the OXC and OADM, for switching ON/OFF of light and the like. Further, the optical filter is used, for example, for wavelength switching in the OXC and OADM, for separating the respective wavelengths on the receiving side, for cutting off ASE light and the like.

By forming the above mentioned optical devices on a substrate made of $SiO_2$, $LiNbO_3$ and the like, it becomes possible to achieve the high functions, down-sizing, integration, reduction of electricity, and reduction of cost. The plurality of optical devices integrated on the substrate are used individually in parallel with one another, or are cascade connected in a multi-staged structure to be used, so as to achieve the respective functions thereof. Thus, in a case where the respective optical devices are used individually in parallel with one another, an effect owing to the integration becomes large. Further, in a case where the respective optical devices are cascade connected in a multi-staged structure to be used, it becomes possible to achieve the improvement of extinction ratio, if the optical devices are optical switches, while if the optical devices are optical filters, such as, acousto-optic tunable filters (AOTFs), it becomes possible to achieve the narrow transmission band, the improvement of suppression ratio between other channels, and the improvement of extinction ratio when used as notch filters. Moreover, if optical devices having different functions from one another are cascade connected in a multi-staged structure to be used, it becomes possible to achieve a high function and the like.

For example, in a case where a plurality of optical devices each having polarization dependence are connected to be used, generally, an optical path having polarization-preserving characteristic is used for connecting the respective optical devices. This optical path having polarization-preserving characteristic is the one capable of propagating an input light therethrough while holding the polarization plane of the input light in a certain direction. As a specific example of such an optical path, there is known a polarization-preserving fiber having a PANDA type structure or an elliptical cladding type structure. Such a polarization-preserving fiber is provided with an asymmetric stress supplying section in a fiber section, to cause a state wherein the refractive indexes sensed by the polarization light are different from each other in the axis directions crossing each other.

In a case where the plurality of optical devices are connected by such a polarization-preserving optical path, it is an ideal to perform the connection by completely coinciding the polarization axis (Fast axis, Slow axis) directions of the polarization-preserving optical path with the axis direction of polarization light to be input/output to/from the optical devices. However, in the actual connection of the polarization-preserving optical path with the optical devices, it is difficult to completely coincide the axis directions with each other and thus, certain axis deviation cannot be avoided.

If the axis deviation as mentioned above is caused, as shown in the lower part of FIG. 13, the inter-polarization-mode interference is caused in the polarization-preserving optical path, resulted in the periodic wavelength dependence loss in the transmission characteristics of optical devices. The period of this periodic wavelength dependence loss becomes $1/\tau$, if a difference between the propagation times of Fast axis and Slow axis of the polarization-preserving optical path is $\tau$. Such a periodic wavelength dependence loss due to the inter-polarization-mode interference in the polarization-preserving optical path causes a change in level of transmission light in an optical filter of band rejection type according to the wavelength, to lead characteristic deterioration, if, for example, a rejection type optical filter (notch filter) is structured by a plurality of optical devices. Further, if the polarization light is input to the polarization preserving optical path in the above connection state, there is caused a problem in that the polarization mode dispersion (PMD) occurs in the optical path.

SUMMARY OF THE INVENTION

The present invention has been achieved in view of the above problems, and an object of the present invention is to provide a connecting method of optical devices capable of suppressing a periodic wavelength dependence loss and the like due to the inter-polarization-mode interference occurring when a plurality of optical devices are connected using an optical path having a polarization-preserving characteristic, and an optical apparatus applied with the connecting method.

In order to achieve the above object, the present invention provides a connecting method of optical devices for connecting a plurality of optical devices with one another using an optical path having a polarization-preserving characteristic, wherein the optical devices are connected to one another by the optical path including optical characteristics in which a light is propagated along two different polarization axes for substantially equal distances.

Moreover, the present invention provides an optical apparatus comprising a plurality of optical devices connected to one another using an optical path having a polarization-preserving characteristic, wherein the optical path includes optical characteristics in which a light to be transmitted among the optical devices connected to one another is propagated along two different polarization axes for substantially equal distances.

According to the connecting method of optical devices and the optical apparatus as mentioned above, even if the polarization direction of light input/output to/from the optical devices is not completely coincident with the polarization direction of the optical path, the periodic wavelength dependence loss caused by the inter-polarization-mode interference in the optical path is offset to be suppressed, and also the polarization mode dispersion (PMD) caused in the optical path is suppressed.

For the above described optical path, there may be used an optical path having, in the vicinity of the center thereof in a longitudinal direction, a cross-connecting section connected by rotating the polarization axis by substantially 90 degrees, or an optical path having, at predetermined positions thereof in a longitudinal direction, a plurality of cross-connecting sections connected by rotating the polarization axes by 90 degrees, respectively.

Further, specific constitutions of the plurality of optical devices may include, for example, optical filter devices, such as, acousto-optic tunable filters (AOTFs), electro-optic tunable filters (EOTFs) and the like, or planar lightwave circuit (PLC) devices.

Further objects, features and advantages of the present invention will become more apparent from the following description of preferred embodiments when read in conjunction with the accompanying drawings.

BRIEF EXPLANATION OF THE DRAWINGS

FIG. 9 is a conceptual diagram for explaining filter characteristics of an optical filter of rejection type, in which

FIG. 10 is a diagram for explaining the deviation of selected wavelengths inherent to the substrate on which three-staged AOTFs are integrated, in which

DETAILED DESCRIPTION OF THE PREFERRED EMBODIMENTS

Embodiments of the present invention will be described based on the drawings.

Figure 1:
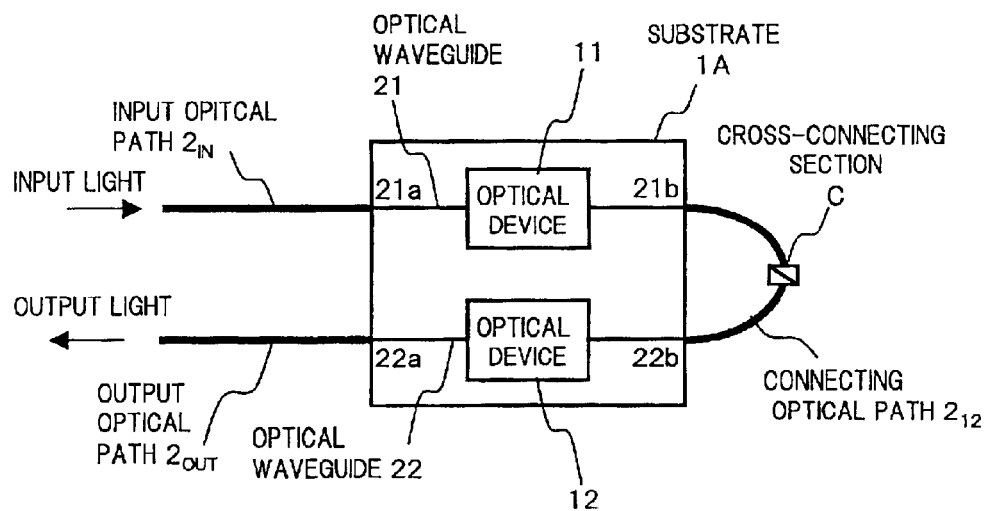
FIG. 1 is a block diagram showing a first embodiment of an optical apparatus according to the present invention.

FIG. 1 is a block diagram showing a first embodiment of an optical apparatus applied with a connecting method of optical devices according to the present invention.

In FIG. 1, the optical apparatus in the first embodiment has a constitution in which two optical devices 11 and 12 each having polarization dependence, formed on two optical waveguides 21 and 22 within the same substrate 1A, respectively, are connected with each other by a connecting optical path $2_{12}$ having a polarization-preserving characteristic, and the connecting optical path $2_{12}$ is provided with a cross-connecting section C in the vicinity of the center thereof in a longitudinal direction.

The connecting optical path $2_{12}$ is a polarization-preserving fiber, and here, for example, a PANDA type fiber is used. However, the structure of polarization-preserving fiber is not limited to the PANDA type fiber, and it is possible to adopt a known structured fiber. Moreover, a waveguide type optical path may be used as the connecting optical path $2_{12}$. The cross-connecting section C is spliced by rotating the polarization axis by substantially 90 degrees in the vicinity of the center of the connecting optical path $2_{12}$ in the longitudinal direction. By means of this cross-connecting section C, the polarization light passing through the connecting optical path $2_{12}$ is propagated through two different polarization axes for substantially equal distances. The method of connecting the optical path in the cross-connecting section C is not limited to the splicing. It is possible to adopt an arbitrary connecting method capable of holding the cross-connection state of polarization axes.

The substrate 1A is constituted such that the two optical waveguides 21 and 22 substantially parallel with each other, and the two optical devices 11 and 12 are formed on a substrate material made of, for example, $SiO_2$ or $LiNbO_3$, by applying a required treatment on the substrate material. The optical devices 11 and 12 may be known optical devices each having polarization dependence. Specifically, a polarization beam splitter (PBS) having polarization dependence loss (PDL), and an optical switch, optical attenuator, optical filter and the like constituted by using the PBS, respectively, may be used as optical devices 11 and 12.

The optical device of the present invention is not limited to the example described above. Further, the plurality of optical devices to be connected to one another may be the ones having same functions or having different functions. Moreover, needless to say, a planar lightwave circuit (PLC) device in which multiple optical components are integrated on the same substrate, may be used as the optical device of the present invention.

In the above substrate 1A, an input optical path $2_{IN}$ that guides an input light from the outside to the substrate 1A is connected to one end 21a of the optical waveguide 21, while an output optical path $2_{OUT}$ that guides an output light from the substrate 1A to the outside is connected to one end 22a of the optical waveguide 22. Then, the other ends 21b and 22b of the optical waveguides 21 and 22 are connected to each other by the connecting optical path $2_{12}$ having the cross-connecting section C, so that the optical devices 11 and 12 on the substrate 1A are cascade connected.

In the optical apparatus having the above constitution, the input light from the outside is propagated through the input optical path $2_{IN}$, to be input to the one end 21a of the optical waveguide 21, and passes through the optical waveguide 21 to be given to the optical device 11. The polarization light passed through the optical device 11 having polarization dependence is output from the other end 21b of the optical waveguide 21 to the connecting optical path $2_{12}$.

The polarization light output to the connecting optical path $2_{12}$ passes through a PANDA type fiber having the cross-connecting section C spliced by 90 degrees in the vicinity of the center of the connecting optical path $2_{12}$ in the longitudinal direction, to be sent to the other end 22b of the optical waveguide 22. At this time, since the directions of Fast axis and Slow axis of the PANDA type fiber are switched to each other in front of and behind the cross-connecting section C, the polarization light being propagated within the connecting optical path $2_{12}$ is propagated through the respective axes for substantially equal distances. Thus, even if the polarization direction of the light to be output to the connecting optical path $2_{12}$ from the other end 21b of the optical waveguide 21 is not completely coincident with the polarization axis of the connecting optical path $2_{12}$, a periodic wavelength dependence loss caused in the first half of the connecting optical path $2_{12}$ and a periodic wavelength dependence loss caused in the latter half of the connecting optical path $2_{12}$, due to the inter-polarization-mode interference, are offset to each other, to be suppressed. Further, similarly to this, the polarization mode dispersion (PMD) caused in the connecting optical path $2_{12}$ is suppressed at the same time. Moreover, in a case where the optical devices 11 and 12 include the polarization dependence losses, respectively, these losses are offset to each other, to be suppressed.

The polarization light propagated through the connecting optical path $2_{12}$ is input to the other end 22b of the optical waveguide 22 on the substrate 1A, and passes through the optical waveguide 22 to be given to the optical device 12. The light passed through the optical device 12 is output from the one end 22a of the optical waveguide 22, and is propagated through the output port $2_{OUT}$ to be output to the outside as an output light from the present optical apparatus.

As described above, according to the present optical apparatus, since the optical devices 11 and 12 each having polarization dependence are connected to each other by using the polarization-preserving type connecting optical path $2_{12}$ having the cross-connecting section C, it becomes possible to suppress, simultaneously, the periodic wavelength dependence losses due to the inter-polarization-mode interference and PMD caused in the connecting optical path $2_{12}$, and also PDLs in the optical devices 11 and 12.

In the above first embodiment, there has been shown the case where the connecting optical path $2_{12}$ has the cross-connecting section C at a position in the vicinity of the center thereof in the longitudinal direction. However, the present invention is not limited thereto, and it is possible to use the connecting optical path $2_{12}$ having a plurality of cross-connecting sections C. In this case, the plurality of cross-connecting sections C are arranged at required positions, so that the polarization light passing through the connecting optical path $2_{12}$ is propagated through two different axes for substantially equal distances over the whole length of the connecting optical path $2_{12}$.

Next, there will be described a second embodiment of an optical apparatus according to the present invention.

Figure 3:
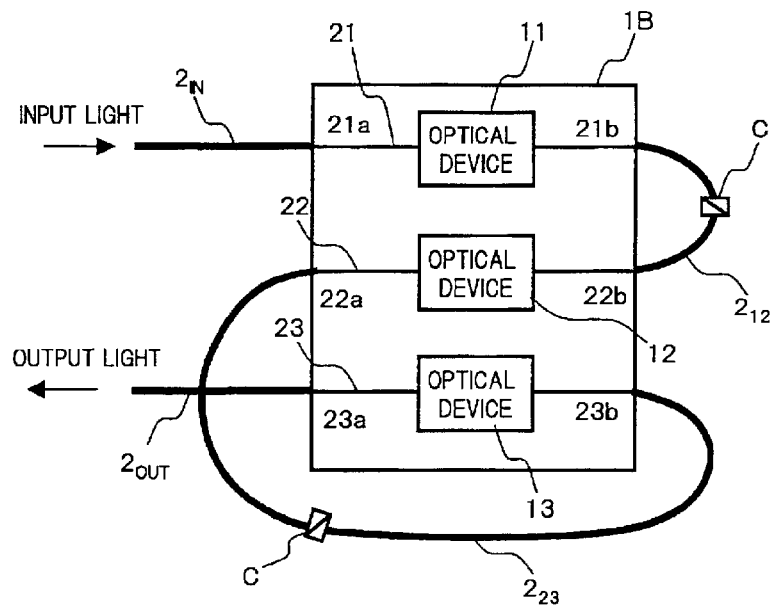
FIG. 3 is a block diagram showing a second embodiment of an optical apparatus of according to the present invention.

FIG. 3 is a block diagram showing the second embodiment of an optical apparatus applied with a connecting method of optical devices according to the present invention. Same components as those in the first embodiment are denoted by the same reference numerals and the descriptions thereof shall be omitted. Same rules shall be applied to the other embodiments.

In FIG. 3, the optical apparatus of the second embodiment corresponds to a case where three optical devices integrated on the same substrate are cascade connected. Specifically, three optical devices 11, 12 and 13 each having polarization dependence, that are formed on three optical waveguides 21, 22 and 23 within a substrate 1B, respectively, are connected to one another by means of polarization preserving type connecting optical paths $2_{12}$ and $2_{23}$ each having the cross-connecting section C in the vicinity of the center thereof in a longitudinal direction.

In the substrate 1B of the present optical apparatus, for example, the input port $2_{IN}$ is connected to the one end 21a of the optical waveguide 21, while the output port $2_{OUT}$ is connected to one end 23a of the optical waveguide 23. Then, the one end 22a of the optical waveguide 22 and the other end 23b of the optical waveguide 23 are connected to each other via the connecting optical path $2_{23}$ having the cross-connecting section C, and also, the other end 22b of the optical waveguide 22 and the other end 21b of the optical waveguide 21 are connected to each other via the connecting optical paths $2_{12}$ having the cross-connecting section C, so that the three optical devices 11 to 13 on the substrate 1B are cascade connected.

The connecting optical path $2_{23}$ is the one same as the connecting optical paths $2_{12}$ described in the first embodiment, and, for example, the polarization-preserving fiber, such as a PANDA type fiber and the like, is used as the connecting optical path $2_{23}$. The cross-connecting section C of this connecting optical path $2_{23}$ has the constitution same as the case in FIG. 2, and therefore, the polarization light to be propagated within the connecting optical path $2_{23}$ is propagated through two different polarization axes for substantially equal distances. Further, the substrate 1B, as in the first embodiment, is constituted such that three optical waveguides 21 to 23 substantially parallel with one another, and three optical devices 11 to 13 are formed on a required substrate material.

In the optical apparatus having the above constitution, the input light from the outside is propagated through the input optical path $2_{IN}$, to be input to the one end 21 a of the optical waveguide 21, and passes through the optical waveguide 21 to be given to the optical device 11. Then, the light passed through the optical device 11 is output from the other end 21b of the optical waveguide 21, and is propagated through the connecting optical path $2_{12}$, to be input to the other end 22b of the optical waveguide 22 on the substrate 1B, and further passes through the optical waveguide 22, to be given to the optical device 12. The light passed through the optical device 12 is output from the one end 22a of the optical waveguide 22, and is propagated through the connecting optical path $2_{23}$, to be input to the other end 23b of the optical waveguide 23 on the substrate 1B, and further passes through the optical waveguide 23, to be given to the optical device 13. The light passed through the optical device 13 is output from the one end 23a of the optical waveguide 23, and is propagated through the output optical path $2_{OUT}$, to be output to the outside as an output light of the present optical apparatus.

Also in the present optical apparatus in which the light is propagated as described above, as in the first embodiment, since the optical devices 11 to 13 are connected to one another by the connecting optical paths $2_{12}$ and $2_{23}$ each having the cross-connecting section C, the polarization light passing through the connecting optical paths $2_{12}$ and $2_{23}$ are propagated through two different polarization axes of the polarization-preserving fibers for substantially equal distances. Thus, even if the polarization direction of the light to be sent to the connecting optical paths $2_{12}$ and $2_{23}$ is not completely coincident with the polarization axes of the respective connecting optical paths, it becomes possible to suppress, simultaneously, the periodic wavelength dependence losses due to the inter-polarization-mode interference and PMD caused in the connecting optical paths $2_{12}$ and $2_{23}$, and also PDLs in the optical devices 11 to 13.

In the first or second embodiment, two or three optical devices on the same substrate are cascade connected. However, the connecting method according to the present invention can be applied to a case where four or more optical devices on the same substrate are cascade connected, in the same manner as described above. Further, there has been shown the case where the optical devices on the same substrate are connected, but the present invention is useful for connecting a plurality of optical devices formed on different substrates.

Next, there will be described a third embodiment of an optical apparatus according to the present invention.

Figure 4:
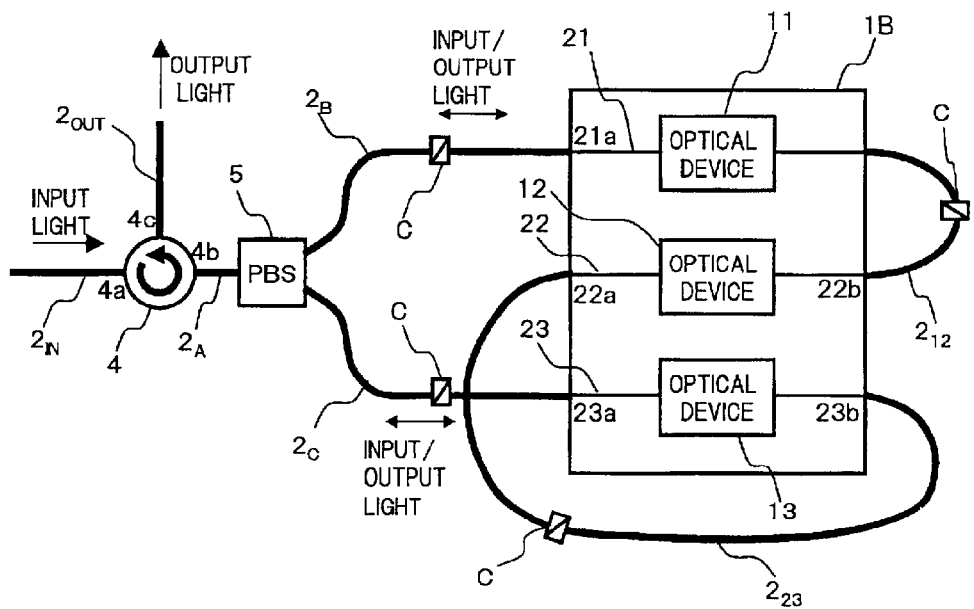
FIG. 4 is a block diagram showing a third embodiment of an optical apparatus of according to the present invention.

FIG. 4 is a block diagram showing the third embodiment of an optical apparatus applied with a connecting method of optical devices according to the present invention.

In FIG. 4, the optical apparatus of the third embodiment corresponds to, for example, a case where three optical devices integrated on the same substrate are cascade connected in a loop. Specifically, optical input and output portions of the substrate 1B that has the same constitution as in the second embodiment are connected to the input optical path $2_{IN}$ and the output optical path $2_{OUT}$ by using an optical circulator 4, a polarization beam splitter (PBS) 5 and connecting optical paths $2_A$, $2_B$, $2_C$, so that the three optical devices 11 to 13 are cascade connected in a loop.

The optical circulator 4 is a typical optical component that includes at least three ports 4a, 4b and 4c, and transmits the light only in a direction from the port 4a to port 4b, from the port 4b to port 4c, and from the port 4c to port 4a. This optical circulator 4 is connected with the input optical path $2_{IN}$, the connecting optical path $2_A$ to be connected to a PBS 5, and the output optical path $2_{OUT}$, to the port 4a, port 4b, and port 4c, respectively.

The PBS 5 splits an input light sent from the port 4b of the optical circulator 4 via the connecting optical path $2_A$ into two polarization lights with polarization planes thereof being orthogonal to each other, to output one of the two polarization lights to one end of the connecting optical path $2_B$, while outputting the other polarization light to one end of the connecting optical path $2_C$. The other end of the connecting optical path $2_B$ is connected to the one end 21a of the optical waveguide 21 on the substrate 1B, and the other end of the connecting optical path $2_C$ is connected to the one end 23a of the optical waveguide 23 on the substrate 1B. Further, the PBS 5 multiplexes two polarization lights with the polarization planes being crossing each other sent from the substrate 1B via the connecting optical paths $2_A$ and $2_B$, to output the multiplexed polarization light to the connecting optical path $2_A$.

Note, the constitution that the one end 22a of the optical waveguide 22 on the substrate 1B is connected to the other end 23b of the optical waveguide 23 via the connecting optical path $2_{23}$ having the cross-connecting section C, and the other end 21b of the optical waveguide 21 is connected to the other end 22b of the optical waveguide 22 via the connecting optical path $2_{12}$ having the cross-connecting section C, is same as for the second embodiment.

For the connecting optical paths $2_B$ and $2_C$ for connecting the PBS 5 and the substrate 1B, polarization-preserving fibers, such as, PANDA type fiber and the like, are used as for the connecting optical paths $2_{12}$ and $2_{23}$. Each of these connecting optical paths $2_B$ and $2_C$ has cross-connecting section C in the vicinity of the center thereof in a longitudinal direction. The cross-connecting section C of each of the connecting optical paths $2_B$ and $2_C$ has the constitution same as the case in FIG. 2, and therefore, the polarization lights to be propagated within the connecting optical paths $2_B$ and $2_C$ are propagated through two different polarization axes for substantially equal distances.

In the optical apparatus having the above constitution, the input light being propagated through the input optical path $2_{IN}$ is sent to the PBS 5 via the optical circulator 4 and the connecting optical path $2_A$, and is split into two polarization lights crossing each other to be output to the connecting optical paths $2_B$ and $2_C$, respectively.

One polarization light output to the connecting optical path $2_B$ from the PBS 5 is input to the one end 21a of the optical waveguide 21 on the substrate 1B, and passes through the optical waveguide 21 to be given to the optical device 11, and then passes through the connecting optical path $2_{12}$ and the optical waveguide 22 to be given to the optical device 12, and further, passes through the connecting optical path $2_{23}$ and the optical waveguide 23 to be given to the optical device 13. Then, the polarization light passed through the optical device 13 is output to the connecting optical path $2_C$ from the one end 23a of the optical waveguide 23, to be returned the PBS 5.

Further, the other polarization light output to the connecting optical path $2_C$ from the PBS 5 passes through the respective optical devices on the substrate 1B in a direction opposite to the direction of the one polarization light. That is, the other polarization light is input to the one end 23a of the optical waveguide 23 on the substrate 1B, and passes through the optical waveguide 23 to be given to the optical device 13, and then passes through the connecting optical path $2_{23}$ and the optical waveguide 22 to be given to the optical device 12, and further, passes through the connecting optical path $2_{12}$ and the optical waveguide 21 to be given to the optical device 11. Then, the polarization light passed through the optical device 11 is output to the connecting optical path $2_B$ from the one end 21a of the optical waveguide 21, to be returned the PBS 5.

Also in the present optical apparatus in which the light is propagated as described above, as in the second embodiment, since the optical devices 11 to 13 are connected to one another by the connecting optical paths $2_{12}$ and $2_{23}$ each having the cross-connecting section C, and also the PBS 5 and the substrate 1B are connected to each other by the connecting optical paths $2_B$ and $2_C$ each having the cross-connecting section C, the polarization lights passing through the connecting optical paths $2_{12}$, $2_{23}$, $2_B$ and $2_C$ are propagated through two different polarization axes of the polarization-preserving fibers for substantially equal distances. Thus, even if the polarization directions of the lights to be sent to the connecting optical paths $2_{12}$, $2_{23}$, $2_B$ and $2_C$ are not completely coincident with the polarization axes of the respective connecting optical paths, it becomes possible to suppress, simultaneously, the periodic wavelength dependence losses due to the inter-polarization-mode interference and PMD caused in the connecting optical paths $2_{12}$, $2_{23}$, $2_B$ and $2_C$, and also PDLs in the optical devices 11 to 13.

Note, in the third embodiment, the three optical devices on the same substrate are cascade connected in a loop by applying the connecting method according to the present invention. However, it is also possible to cascade connect two optical devices, or four or more optical devices on the same substrate in a loop by applying the connecting method according to the present invention.

Next, there will be described in detail a more specific embodiment of an optical apparatus applied with a connecting method of an optical function device according to the present invention. In the following, the consideration is made, as an example, on a rejection type optical filter (notch filter) embodied the optical apparatus of the third embodiment as a basic constitution.

Figure 5:
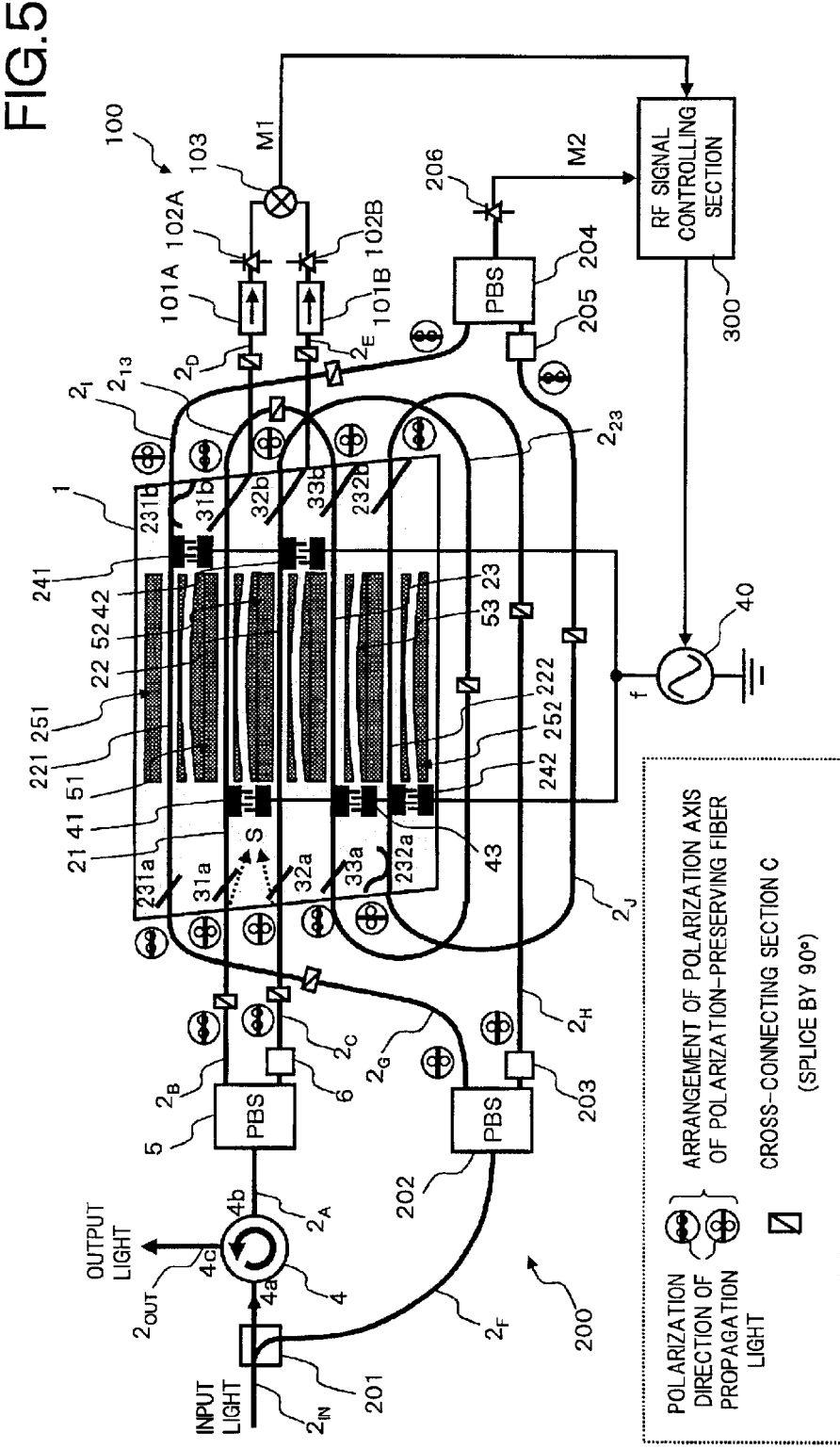
FIG. 5 is a plan view showing a constitution of rejection type optical filter as a specific example of an optical apparatus according to the present invention.

FIG. 5 is a plan view showing the constitution of the rejection type optical filter.

In the rejection type optical filter shown in FIG. 5, acousto-optic tunable filters (AOTF) are adopted as three optical devices 11 to 13 formed on the same substrate 1. Optical input and output portions of the substrate 1 are connected to the input optical path $2_{IN}$ and the output optical path $2_{OUT}$ by using the optical circulator 4, the polarization beam splitter (PBS) 5, a polarization rotating section 6 and the connecting optical paths $2_A$, $2_B$, $2_C$, so that the three AOTFs on the substrate 1 are cascade connected in a loop.

Further, the present rejection type optical filter is provided with a first monitoring section 100 that monitors a dropped light blocked from passing through by a required AOTF, so as to perform a tracking control of the operation states of the AOTFs cascade loop connected on the substrate 1. Moreover, the present rejection type optical filter is provided with a second monitoring section 200 that monitors the lights passed through monitoring AOTFs on the substrate 1, which operate in accordance with the parameter same as for the AOTFs, in order to previously detect a control value of the AOTFs cascade loop connected on the substrate, at the starting, the alteration of setting or the like, of the present optical filter. The monitoring results of the first and second monitoring sections 100 and 200 are sent to an RF signal controlling section 300 that controls RF signals to be given to the respective AOTFs, to control the operation states of AOTFs.

The substrate 1 is constituted such that five optical waveguides 21, 22, 23, 221 and 222 substantially parallel with one another are formed on a substrate material made of, for example, LiNbO$_3$. The optical waveguides 21 to 23 are used for the main signal, and the optical waveguides 221 and 222 are used for the second monitoring section 200. The respective optical waveguides 21, 22, 23, and 221, 222 are provided with polarization beam splitters (PBS) 31a, 31b, 32a, 32b, 33a, 33b, and 231a, 231b, 232a, 232b, respectively, at both end portions thereof. Also, the substrate 1 is formed with interdigital transducers (IDT) 41, 42, 43, and 241, 242, and SAW guides 51, 52, 53, and 251, 252, corresponding to the optical waveguides 21, 22, 23, and 221, 222, respectively.

As the respective PBSs 31a, 31b, 32a, 32b, 33a and 33b for main signal, it is possible to use, for example, PBSs of crossing waveguide type and the like. Here, input and output ports of the PBSs positioned at the crossing sides of the crossing waveguides are connected to the optical waveguides, respectively, so that the respective PBSs are constituted to be of TE mode transmission type. Further, as the respective PBSs 231a, 231b, 232a and 232b for the second monitoring section 200, it is possible to use, for example, PBSs of crossing waveguide type and the like. However, herein, input and output ports of the PBSs 231a and 232b positioned at the crossing sides of the crossing waveguides are connected to the optical waveguides, respectively, so that the PBSs 231a and 232b are constituted to be of TE mode transmission type, while input and output ports of the PBSs 231b and 232a positioned at the bar sides of the crossing waveguides are connected to the optical waveguides, respectively, so that the PBSs 231b and 232a are constituted to be of TM mode transmission type.

The respective IDTs 41 to 43, 241 and 242 are applied commonly with a signal of required frequency f generated by an RF signal generating circuit 40, to generate surface acoustic waves (SAW), respectively, on the substrate 1. Note, as will be described later, positions of the respective IDTs 41 to 43, 241 and 242 are preferably set such that relationships between the propagation directions of SAWs and the propagation directions of lights within the corresponding optical waveguides are those taking into account of influences of selected wavelength Doppler shift and the like.

The SAW guides 51 to 53, 251 and 252 are those for propagating respective SAWs generated at the IDTs 41 to 43, 241 and 242 through the optical waveguides 21 to 23, 221 and 222, respectively. Here, a case is shown where, for example, SAW guides of directional coupling type formed in required shape by Ti diffusion are used, as the SAW guides 51 to 53, 251 and 252.

In the AOTF using the SAW guides of directional coupling type, SAWs generated at the IDTs are directionally coupled by the SAW guides of required shape, so that SAWs most strongly interfere the light being propagated through the optical waveguide in the vicinity of the center of mode conversion area. Thus, it is possible to achieve the suppression of side lobe level in the filter characteristics of AOTF. Note, in the SAW guides shown in FIG. 5, curving shapes are adopted in order to directionally couple SAWs in accordance with a further desired function. In this way, it becomes possible to suppress further effectively the side lobe level.

Here, the case is shown where the AOTF using the SAW guides of directional coupling type is used. However, the present invention is not limited thereto, and it is possible to use AOTF and the like formed with SAW guides of thin film type on the optical waveguides. Further, for the AOTF using the SAW guides of thin film type, the arrangement may be such that the longitudinal direction of each SAW guide is inclined by a required amount to the axial direction of the optical waveguide so that the propagation axis of SAW and the optical axis cross each other at an inclined angle. By adopting such an arrangement, the intensity of surface acoustic wave sensed by the light is weighted in the longitudinal direction. Thus, it becomes possible to achieve the suppression of side lobe level.

The optical circulator 4 and the PBS 5 are the same as those used in the third embodiment. In this optical circulator 4, the input optical path $2_{IN}$ is connected to the port 4a via an optical coupler 201, the connecting optical path $2_A$ to be connected to the PBS 5 is connected to the port 4b, and the output optical path $2_{OUT}$ is connected to the port 4c.

The connection of the PBS 5 and the substrate 1 is such that the other end of the connecting optical path $2_B$, to the one end of which the one polarization light split by the PBS 5 is input, is connected to the PBS 31a positioned on the optical waveguide 21 of the substrate 1. The other end of the connecting optical path $2_C$, to the one end of which the other polarization light split by the PBS 5 is input, is connected to the PBS 32a positioned on the optical waveguide 22 of the substrate 1. Also, herein, the polarization rotating section 6 is inserted onto the connecting optical path 2c. The polarization rotating section 6 has a function for rotating the polarization plane of the other polarization light split by the PBS 5 by 90 degrees.

The PBS 31b positioned on the optical waveguide 21 of the substrate 1 is connected to the PBS 33b positioned on the optical waveguide 23 by the connecting optical path $2_{13}$. Further, the PBS 32b positioned on the optical waveguide 22 of the substrate 1 is connected to the PBS 33a positioned on the end portion of the optical waveguide 23 by the connecting optical path $2_{23}$. Thus, the three AOTFs for main signal on the substrate 1 are cascade connected in a loop between the input optical path $2_{IN}$ and the output optical path $2_{OUT}$.

The connecting optical paths $2_B$, $2_C$, $2_{13}$ and $2_{23}$ are polarization-preserving fibers, and here, for example, PANDA type fibers are used. However, the structure of polarization-preserving fiber is not limited to the PANDA type fiber, and it is possible to adopt a known structured fiber. Further, each of the connecting optical paths $2_B$, $2_C$, $2_{13}$ and $2_{23}$ includes the cross-connecting section C in the vicinity of the center thereof in the longitudinal direction. The respective cross-connecting sections C have the same constitution as in FIG. 2, so that the polarization lights being propagated within the connecting optical paths $2_B$, $2_C$, $2_{13}$ and $2_{23}$ are propagated through two different polarization axes for substantially equal distances.

Moreover, the first monitoring section 100 connected to the substrate 1 comprises an optical isolator 101A and a light receiver 102A for monitoring a dropped light from the lights sequentially passing in one direction through the respective AOTFs cascade loop connected to one another, an optical isolator 101B and a light receiver 102B for monitoring a dropped light from the lights sequentially passing in the other direction through the respective AOTFs cascade loop connected to one another, and a circuit 103 that adds up output signals photo-electrically converted by the light receivers 102A and 102B, to output a monitor signal M1.

Here, an input port of the optical isolator 101A is connected to a TM mode output port of the PBS 31b on the substrate 1 via a connecting optical path $2_D$, while an input port of the optical isolator 101B is connected to a TM mode output port of the PBS 32b on the substrate 1 via a connecting optical path $2_E$. As described later, it is desirable to set a position for monitoring the dropped signal for the light in each direction to an AOTF stage wherein the selected wavelength (dropped wavelength) is positioned at the center of blocking band, considering an influence of dithering to be given to the RF signal.

Further, the second monitoring section 200 connected to the substrate 1 includes an optical coupler 201 on the input optical path $2_{IN}$ that branches a part of the input light by a required branching ratio (for example, 10:1 and the like), a PBS 202 that polarization splits the branched light from the optical coupler 201 to send the split lights to the respective monitoring AOTFs on the substrate 1, a PBS 204 that multiplexes the polarization lights passed through the monitoring AOTFs on the substrate 1, and a light receiver 206 that converts the monitor light multiplexed by the PBS 204 into an electrical signal, to thereby output a monitor signal M2.

The PBS 202 splits the branched light sent from the optical coupler 201 via a connecting optical path $2_F$ into two polarization lights with polarization planes thereof being orthogonal to each other, and outputs one of the polarization lights to one end of a connecting optical path $2_G$, while outputting the other polarization light to one end of a connecting optical path $2_H$. The other end of the connecting optical path $2_G$ is connected to a PBS 231a positioned on the optical waveguide 221 of the substrate 1, and the other end of the connecting optical path $2_H$ is connected to a PBS 232b positioned on the optical waveguide 222 of the substrate 1. Also, herein, a polarization rotating section 203 is inserted onto the connecting optical path $2_H$. The polarization rotating section 203 has a function for rotating the polarization plane of the other polarization light split by the PBS 202 by 90 degrees.

The PBS 204 multiplexes the polarization lights with polarization planes thereof being orthogonal to each other, passed through the monitoring AOTFs on the substrate 1 to be sent via respective connecting optical paths $2_I$ and $2_J$, to output the multiplexed light to the light receiver 206. Specifically, a TM mode light output from a PBS 231b on the optical waveguide 221 of the substrate 1 is input to the PBS 204 through the connecting optical path $2_I$, and at the same time, a TM mode light output from a PBS 232a on the optical waveguide 222 of the substrate 1 passes through the connecting optical path $2_J$ and is rotated with polarization plane thereof by 90 degrees at a polarization rotating section 205, to be input to the PBS 204.

Figure 2:
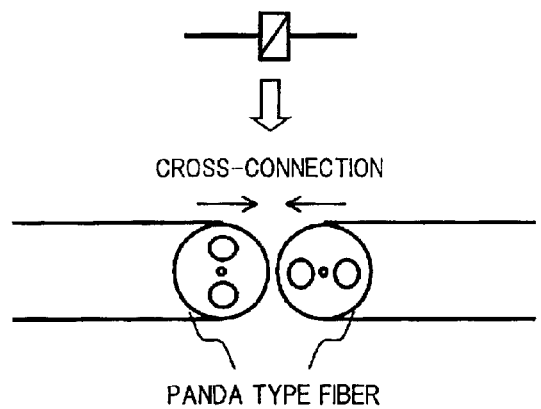
FIG. 2 is a diagram for explaining the cross-connecting section of connecting optical path in an optical apparatus of FIG. 1.

For the respective connecting optical paths $2_D$, $2_E$, $2_G$, $2_H$, $2_I$ and $2_J$ used in the first and second monitoring sections 100 and 200, for example, optical paths of polarization-preserving type such as PANDA type fiber are used, and each optical path includes, in the vicinity of the center in the longitudinal direction, the cross-connecting section C of the same structure as in the above mentioned FIG. 2. Thus, the polarization lights propagated within the connecting optical paths $2_D$, $2_E$, $2_G$, $2_H$, $2_I$ and $2_J$ are propagated through two different axes for substantially equal distances.

Figure 6:
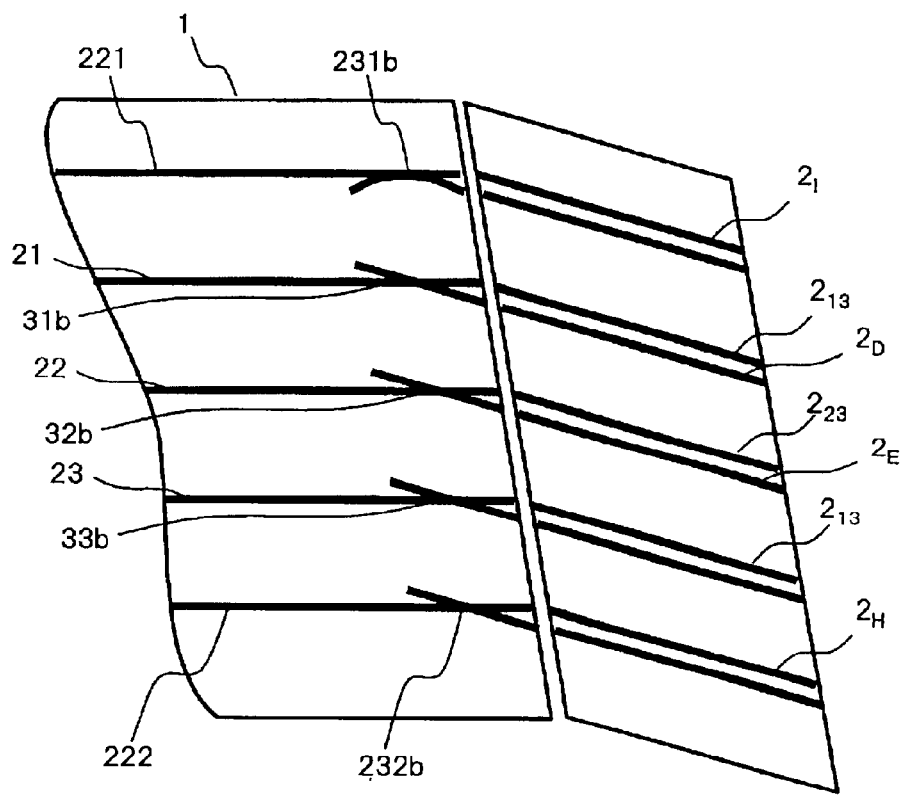
FIG. 6 is a diagram showing one example of the end face shape of a substrate in the rejection type optical filter of FIG. 5.
Figure 7:
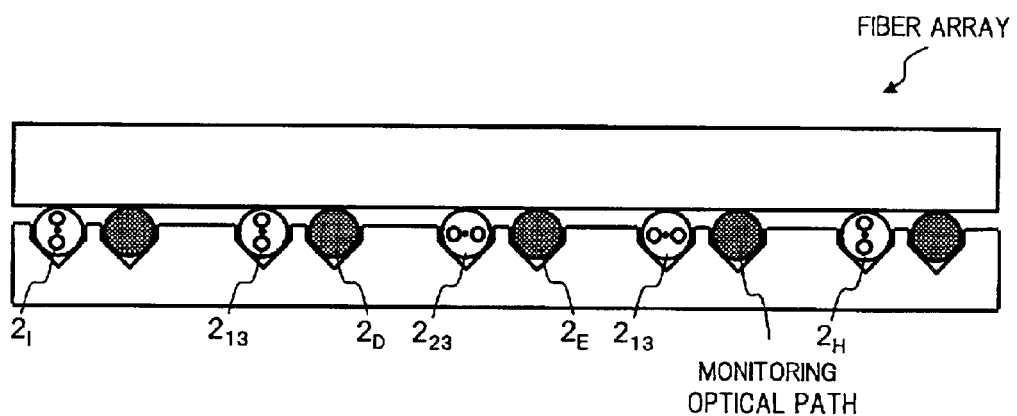
FIG. 7 is a diagram showing one example of fiber array structure connected to the substrate end face in the rejection type optical filter of FIG. 5.

It is preferable that two end faces opposite to each other of the substrate 1, to which the respective optical paths for main signal and for monitoring are connected, are inclined by required angles so as to reduce an influence of reflected light at the faces connected with the respective optical paths, for example, as shown in FIG. 6. Also, it is preferable that the optical fibers to be connected to each of the substrate end faces are structured in a fiber array, for example, as shown in FIG. 7. Note, the optical fibers provided in parallel to the respective connecting optical paths $2_{13}$ and $2_{23}$ in FIG. 7, are for extracting the dropped lights and the like to be blocked from passing through by the AOTFs at respective stages. An arrangement for the polarization axes of the polarization-preserving fibers within the fiber array is desirable to be set, considering the symmetry with a fiber array connected to the substrate end face on the opposite side, so that the kinds of the both side fiber arrays are the same.

In the rejection type optical filter having the above mentioned constitution, as in third embodiment, the input light propagated through the input optical path $2_{IN}$ is sent to the PBS 5 via the optical circulator 4 and the connecting optical path $2_A$, and split into two polarization lights orthogonal to each other, to be output to the connecting optical paths $2_B$ and $2_C$, respectively. The polarization light output to the connecting optical path $2_C$ is rotated with polarization plane thereof by 90 degrees by the polarization rotating section 6, to be aligned with the polarization direction of the polarization light output to the connecting optical path $2_B$. Then, the respective polarization lights propagated through the connecting optical paths $2_B$ and $2_C$ are given to the PBSs 31a and 32a on the substrate 1, respectively, as the TE mode lights. Note, in FIG. 5, the polarization directions of propagated lights are indicated together with the cross section of arrangement of polarization axes of the PANDA type fibers, so that the polarization directions of propagated lights at the respective portions on the optical paths cascade loop connected can be clearly understood.

The TE mode light given to the PBS 31a passes therethrough and is propagated through the optical waveguide 21 toward the PBS 31b. At this time, SAW generated as a result that the RF signal of frequency f from the RF signal generating circuit 40 is applied to the IDT 41, is guided along the optical waveguide 21 by the SAW guide 51, to be propagated in the same direction (forward direction) as the propagated light within the optical waveguide 21. Due to the acousto-optic effect by this SAW, only the light of wavelength corresponding to the frequency of SAW (selected wavelength) out of the TE mode light being propagated within the optical waveguide 21, is mode converted into a TM mode light. Then, the lights of respective modes reach the PBS 31b, the TE mode light of wavelengths different from the selected wavelength (non-selected wavelengths), that has not been mode converted, passes through the PBS 31b to be output to the connecting optical path $2_{13}$, while the mode converted TM mode light of selected wavelength is branched by the PBS 31b as a dropped light, to be sent to the optical isolator 101A of the first monitoring section 100.

The TE mode light output to the connecting optical path $2_{13}$ passes through the PANDA type fiber having the cross-connecting section C that is spliced by 90 degrees in the vicinity of the center in the longitudinal direction, to be sent to the PBS 33b on the optical waveguide 23. At this time, a periodic wavelength dependence loss due to inter-polarization-mode interference, and PMD caused in the connecting optical path $2_{13}$, and PDL caused in the PBS on the substrate 1 and the like are offset in front of and behind the cross-connecting section C, to be suppressed.

The TE mode light sent to the PBS 33b on the substrate 1 passes therethrough and is propagated within the optical waveguide 23 toward the PBS 33a. At this time, SAW generated at the IDT 43 and guided by the SAW guide 53 is propagated in a reverse direction to the propagated light within the optical waveguide 23. Due to the acoust-optic effect by this SAW, only the light corresponding to the selected wavelength out of the TE mode light being propagated through the optical waveguide 23 is mode converted into a TM mode light. Then, when the lights of respective modes reach the PBS 33a, the TE mode light of non-selected wavelengths, that has not been mode converted, passes through the PBS 33a to be output to the connecting optical path $2_{23}$, while the mode converted TM mode light of selected wavelength is branched by the PBS 33a.

The TE mode light output to the connecting optical path $2_{23}$ is sent to the PBS 32b on the optical waveguide 22 while the periodic wavelength dependence loss and the like thereof being suppressed by passing the PANDA type fiber having the cross-connecting section C, in the same manner as when passed through the connecting optical path $2_{13}$.

The TE mode light sent to the PBS 32b passes therethrough and is propagated within the optical waveguide 22 toward the PBS 32a. At this time, SAW generated at the IDT 42 and guided by the SAW guide 52 is propagated in a forward direction to the propagated light within the optical waveguide 22. Due to the acoust-optic effect by this SAW, only the light corresponding to the selected wavelength out of the TE mode light being propagated through the optical waveguide 22 is mode converted into a TM mode light. The TE mode light of non-selected wavelengths, that has not been mode converted, passes through the PBS 32a to be output to the connecting optical path $2_C$, while the mode converted TM mode light of selected wavelength is branched by the PBS 32a. The TE mode light output to the connecting optical path $2_C$ is rotated with the polarization plane thereof by 90 degrees by the polarization rotating section 6 on the connecting optical path $2_C$ and then returned to the PBS 5.

The respective selected wavelengths to be mode converted at the respective optical waveguides 21 to 23 are slightly different from one another, due to the selected wavelength Doppler shift to be described in the following, or inherent wavelength deviation caused by variations in manufacturing process of the substrate 1, even in a constitution where the RF signal is applied commonly to the IDTs 41 to 43.

Here, the selected wavelength Doppler shift will be described.

Figure 8:
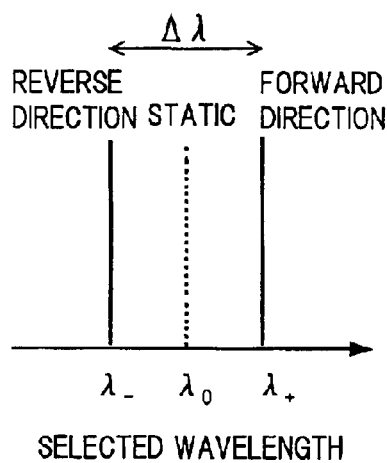
FIG. 8 is a diagram for explaining the selected wavelength Doppler shift in AOTF.

The selected wavelength Doppler shift is a phenomenon in which the wavelengths of the light to be polarization mode converted become different from one another due to the acousto-optic effect, depending on a relationship between the propagation direction of light within the optical waveguide and that of SAW transmitted along that optical waveguide. This phenomenon is caused by the same theory as that of typically known Doppler shift, and in the above case, it can be considered that the wavelength (frequency) of SAW viewed from the light is changed. Accordingly, for example, as shown in FIG. 8, if the propagation direction of light is the same forward direction as the propagation direction of SAW, the wavelength of SAW sensed by the light becomes longer. On the contrary, if the propagation direction of light is the reverse direction to the propagation direction of SAW, the wavelength of SAW sensed by the light becomes shorter. The selected wavelength λ in a case of influenced by such a Doppler shift, can be represented by the following equation (1);

$$\lambda = \frac{\lambda_0}{1 - v/c} \quad (1)$$

wherein $\lambda_0$ is the selected wavelength in a case where SAW is static, v is a speed of SAW, and c is an average speed of light in the optical waveguide.

Accordingly, a selected wavelength difference Δλ caused by whether the propagation directions of the light and SAW are forward directions or reverse directions can be represented by the following equation (2).

$$\Delta\lambda = 2 \cdot \lambda_0 \cdot \frac{v/c}{1 - (v/c)^2} \quad (2)$$

In the rejection type optical filter with three AOTFs cascade loop connected as shown in FIG. 5, the selected wavelengths in the AOTFs at respective stages are different from one another due to the inherent wavelength deviation caused by variations in manufacturing process of the substrate 1 in addition to the selected wavelength difference Δλ due to the above mentioned selected wavelength Doppler shift. The wavelength deviation caused by variations in manufacturing process, for example, is inherently caused in individual substrates due to manufacturing errors in width of the optical waveguides 21 to 23 at respective stages.

Figure 9A:
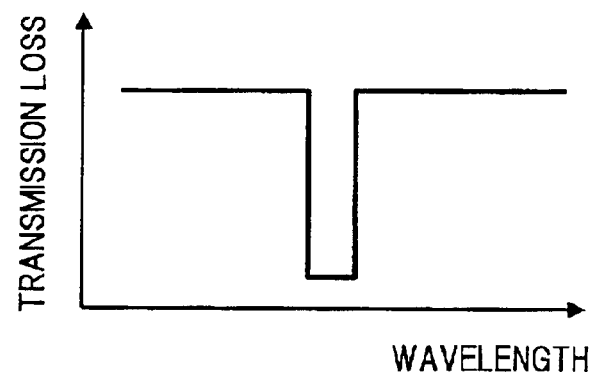
FIG. 9A shows ideal filter characteristics.
Figure 9B:
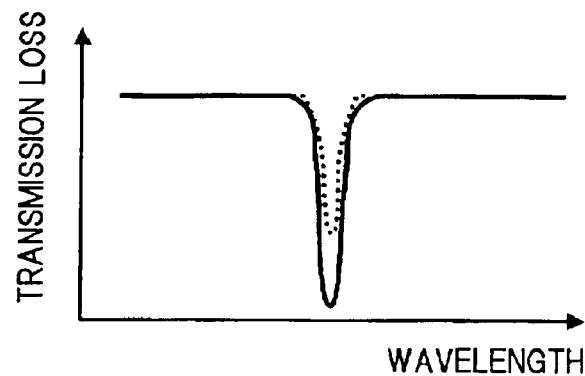
FIG. 9B shows filter characteristics of when the selected wavelengths are coincident with one another in a multi-staged structure.

For the wavelength characteristics of the rejection type optical filter, for example, as shown in the conceptual diagram of FIG. 9A, it is an ideal to have a filter characteristic that is changed in rectangular, namely, a change in transmissivity from the passing band to the blocking band is steep and also the blocking band has a required width. In the multi-staged structure of AOTFs, basically, the filter characteristic having an excellent extinction ratio can be obtained, as the number of stages is increased. At this time, if the selected wavelengths at the respective stages are all coincident, as shown in the conceptual diagram of FIG. 9B, since the transmissivity becomes minimum at one point, the width of blocking band becomes narrower. For the blocking band of the rejection type optical filter, a required width needs to be ensured, considering the conditions of, for example, the wavelength width of optical signal corresponding to the spectrum width of light source such as laser, errors in setting or controlling of AOTFs, or the unstable wavelength of light source. Therefore, according to the filter characteristics as shown in FIG. 9B, it becomes impossible to block the passing of optical signal of desired wavelength even in a case a slight variation is caused in the setting of the optical signal wavelength or the setting of filter.

Figure 9C:
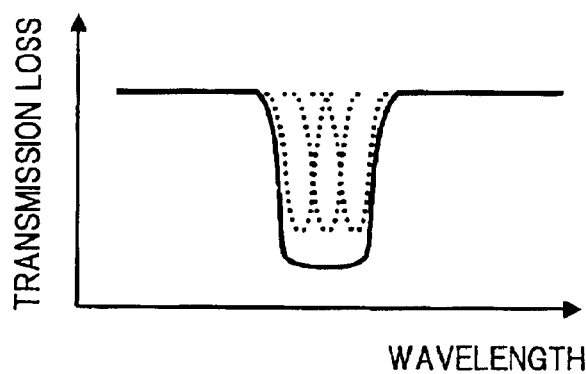
FIG. 9C shows filter characteristics of when the selected wavelengths are different from one another.

Therefore, in the rejection type optical filter shown in FIG. 5, the wavelength deviation inherent to the substrate caused by variations in manufacturing process is considered and also the selected wavelength difference Δλ due to the selected wavelength Doppler shift is utilized, to ensure a required width of blocking band by slightly deviating the selected wavelengths in the AOTFs at respective stages with one another as shown in FIG. 9C.

Figures 10A, 10B, 10C:
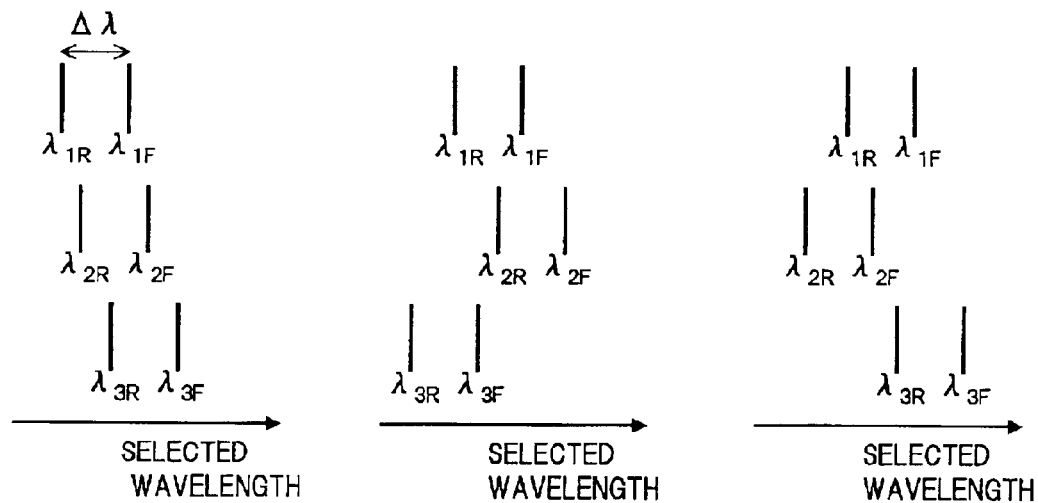
FIG. 10A to FIG. 10C are exemplary diagrams of wavelength deviation patterns.
Figure 10D:
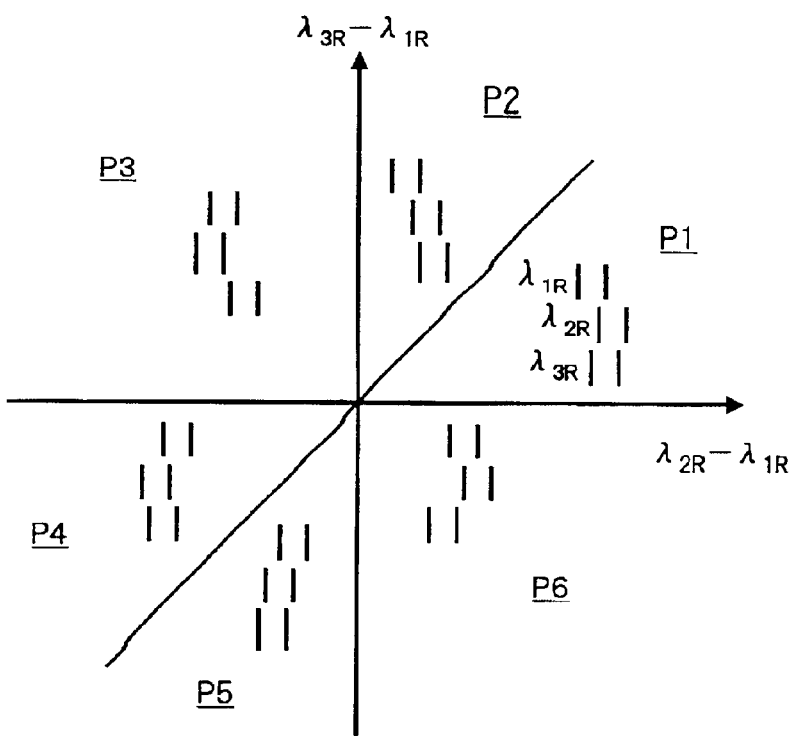
FIG. 10D is a diagram showing a typical wavelength deviation pattern.

Specifically, when the selected wavelengths corresponding to the respective optical waveguides 21, 22, 23 when SAWs of the same frequency f are given in the forward directions to the propagated lights are made $\lambda_{1F}$, $\lambda_{2F}$ and $\lambda_{3F}$, while the selected wavelengths corresponding to the respective optical waveguides 21, 22, 23 when SAWs of the same frequency f are given in the reverse directions to the propagated lights are made $\lambda_{1R}$, $\lambda_{2R}$ and $\lambda_{3R}$, there occurs various patterns in the wavelength deviation inherent to the substrate caused by variations in manufacturing process, as shown in FIG. 10A to FIG. 10C, for example. Such wavelength deviation patterns of the three staged AOTFs can be classified into six patterns P1 to P6 as shown in FIG. 10D when the values of $\lambda_{2R}-\lambda_{1R}$ are put on the horizontal axis and the values of $\lambda_{3R}-\lambda_{1R}$ are put on the transverse axis with the selected wavelength $\lambda_{1R}$ as the reference.

In order to realize the selected wavelengths that are slightly deviated among the respective stages as shown in FIG. 9C, it is required to determine optimum combinations of the wavelength deviation of the patterns P1 to P6, with the wavelength difference due to the selected wavelength Doppler shift. When determining the optimum combinations, it is desired to consider the condition that the connection relationship in which such kinds of fiber arrays as explained in FIG. 7 can be made same on the both ends of the substrate 1, and the connection relationship of the input and output for suppressing an influence by stray light as described in the following, are satisfied at the same time.

In a case where a plurality of optical devices integrated on the same substrate are connected to be used, most of the input light from a substrate input section passes through the optical devices, however, as shown by an arrow in dotted line in FIG. 5, a part of the input light is emitted into the substrate to be propagated as the stray light S. This stray light S is likely to be coupled to an output section bypassing the optical devices, thereby causing deterioration of extinction ratio and the like.

In order to effectively suppress such a leakage phenomenon of the stray light S from the input side to the output side, for example, in a case where a plurality of optical devices on the same substrate are cascade connected to be used, such a connection relationship is preferable that both ends of optical path passing through all of optical devices are positioned on the same end face of the substrate. By realizing such a connection relationship, the stray light S from the input side is hardly to be coupled to the light being propagated within the optical path on the output side.

Figure 11:
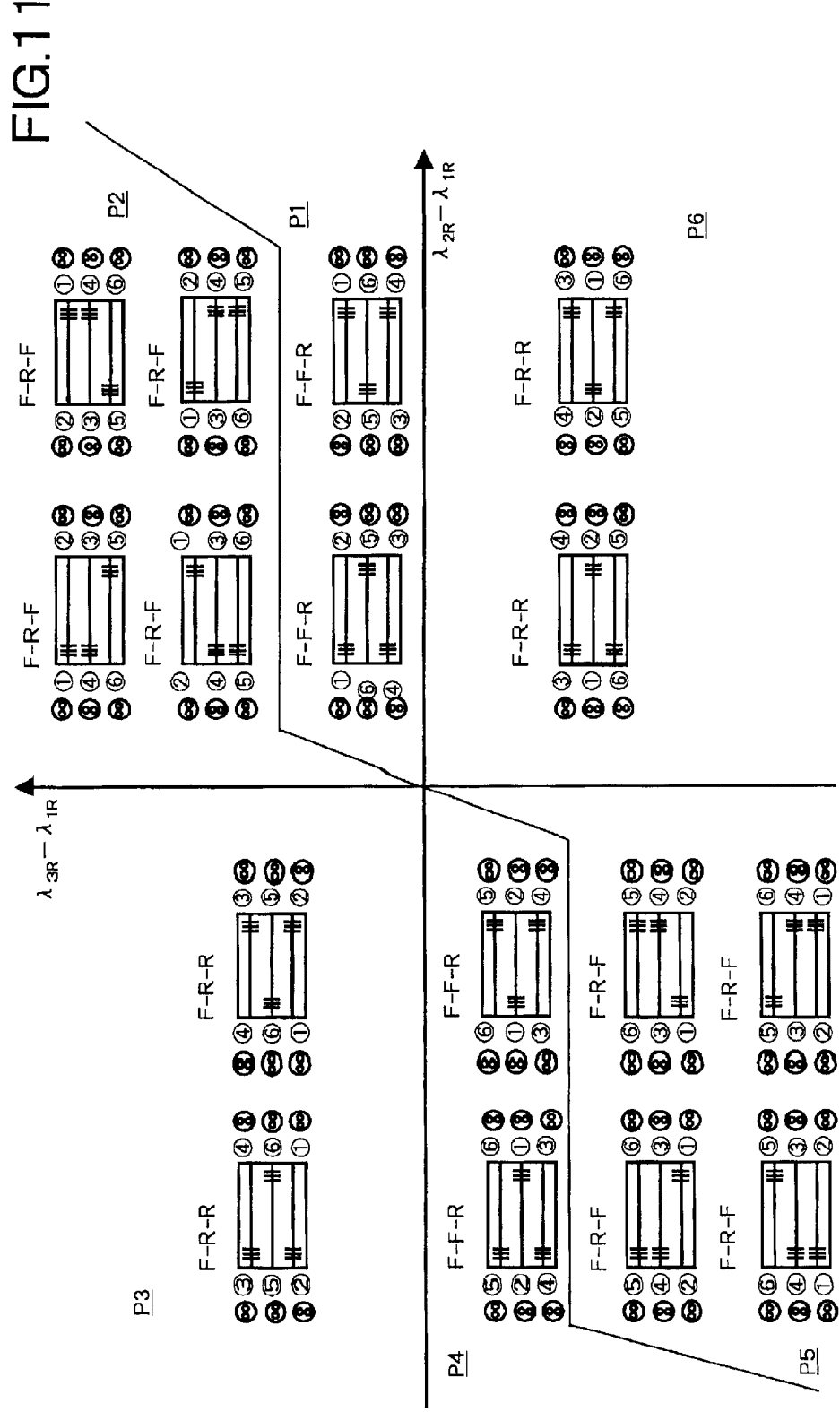
FIG. 11 is a schematic view arranging optimum connection relationships in view of an influence of selected wavelength Doppler shift and the like, according to the wavelength deviation patterns in FIG. 10.

The optimum combinations satisfying all the conditions of the above mentioned selected wavelength Doppler shift and the like, including the connection relationship of input and output for suppressing the above influence by the stray light, can be determined corresponding to the respective patterns P1 to P6 in FIG. 10D, and the combination results are shown in FIG. 11.

In FIG. 11, the numerals ①to ⑥ indicated at both ends of the substrate show the connecting orders of AOTFs at respective stages. Further, characters such as "F-F-R" (forward-forward-reverse) indicated at the upper part of the substrate show the propagation direction of SAW relative to the light being propagated through the optical waveguide positioned at the upper stage of the substrate in the figure, the propagation direction of SAW relative to the light being propagated through the optical waveguide positioned at the middle stage of the substrate, and the propagation direction of SAW relative to the light being propagated through the optical waveguide positioned at the lower stage of the substrate, in this sequence. Further, arrangements of respective polarization axes of when the respective PANDA type fibers connected to the both ends of the substrate are made fiber arrays of same kind, are shown on the right and left sides of the substrate.

The constitution of the optical wavelength variable filter shown in FIG. 5 specifically illustrates the connection relationship corresponding to the pattern P1 in FIG. 11. For the selected wavelength Doppler shift, the arrangement of the IDTs 41, 43 and 42 at the respective stages are set so that, to the light given via the connecting optical path $2_B$, the propagation direction of SAW in the AOTF of the first stage corresponding to the optical waveguide 21 is the forward direction, the propagation direction of SAW in the AOTF of the second stage corresponding to the optical waveguide 23 is the reverse direction, and the propagation direction of SAW in the AOTF of the third stage corresponding to the optical waveguide 22 is the forward direction. In the AOTFs at respective stages, since the RF signal of the same frequency is given to the IDTs, the wavelength difference due to the selected wavelength Doppler shift corresponding to the above equation (2) is caused between the selected wavelengths at the first and third stages, and the selected wavelength at the second stage. Thus, by combining the wavelength difference with the inherent wavelength deviation of the pattern P1, it becomes possible to realize the filter characteristic as shown in FIG. 9C.

In the rejection type optical filter, the TE mode light given from the PBS 5 to the PBS 32a of the substrate 1 via the connecting optical path $2_C$ and the polarization rotating section 6 passes through the AOTFs at respective stages sequentially, in reverse to the TE mode light given to the PBS 31a of the substrate 1 via the connecting optical path $2_B$, namely, passes sequentially through the optical waveguide 22, PBS 32a, connecting optical path $2_{23}$, PBS 33a, optical waveguide 23, PBS 33b, connecting optical path $2_{13}$, PBS 31b, optical waveguide 21 and PBS 31a, to be output to the connecting optical path $2_B$, and is returned to the PBS 5 under the polarization state just as is without polarization plane thereof rotated. In this reverse propagation of the polarization light, the mode converted TM mode light corresponding to the selected wavelength when being propagated through the optical waveguide 22, is branched by the PBS 32b as the dropped light, to be sent to the optical isolator 101B of the first monitoring section 100.

The respective polarization lights with polarization planes thereof being orthogonal to each other, returned to the PBS 5 via the connecting optical paths $2_B$ and $2_C$, are multiplexed by the PBS 5 and thereafter sent to the optical circulator 4 via the connecting optical path $2_A$, to be output to the output optical path $2_{OUT}$ after passing from the port 4b to the port 4c.

As mentioned above, when the polarization lights from the connecting optical paths $2_B$ and $2_C$ are propagated in bi-directions through the three staged AOTFs cascade loop connected on the substrate 1, the stray light S generated from each of the PBSs 31a and 32a at the one end of each of the optical waveguides 21 and 22 is propagated toward the end face on the opposite side to the optical input side of the substrate 1. However, since the connecting optical paths $2_B$ and $2_C$ are connected to the PBSs 31a and 32a positioned on the same end face of the substrate 1, respectively, the leakage phenomenon of the stray light from the input side to the output side is suppressed.

Moreover, in the rejection type optical filter, the dropped lights branched by the PBSs 31b and 32b, pass through the optical isolators 101A and 101B of the first monitoring section 100, to be converted into electrical signals at the light receivers 102A and 102B, respectively, and further are added up by the circuit 103 to be sent to the RF signal controlling section 300 as the monitor signal M1. In the RF signal controlling section 300, the peak wavelengths of the dropped lights are detected based on the monitor signal M1, and an amount of wavelength deviation to the previously set control value (selected wavelength) is obtained based on the monitoring result by the second monitoring section 200.

In the RF signal controlling section 300, as a method for detecting the peak wavelengths of the dropped lights based on the monitor signal M1, for example, a method to add dithering to the frequency f of RF signal to be applied commonly to the IDTs 41 to 43 at the respective stages, is suitable. Specifically, in a case where the frequency f of RF signal is set to, for example, 170 MHz, 4 kHz or the like is set as the frequency Δf of the dithering, and the RF signal of which frequency fluctuates within a range of f±Δf is applied to each of the IDTs 41 to 43. Thus, the selected wavelengths to be mode converted in the AOTFs at the respective stages fluctuate corresponding to the frequency Δf of the dithering. Accordingly, the monitor signal M1 to be monitored by the first monitoring section 100 includes frequency components corresponding to the dithering. Thus, it becomes possible to detect the peak wavelengths of the actually dropped lights by utilizing the detected frequency components.

Here, in a case where the dithering is added to the frequency of RF signal, it is desirable that, for the blocking band as shown in FIG. 9C, the dropped light is taken out from the AOTF stage of which selected wavelength is positioned at the center of the blocking band, to monitor the dropped light by the first monitoring section 100. This is a useful setting for realizing the stable peak wavelength detection, by avoiding such a situation where, for example, if the dropped light from the AOTF stage of which selected wavelength is positioned at the end portion of the blocking band is monitored, the wavelength of the dropped light fluctuating by the dithering reaches the wavelength region where the transmissivity is steeply changed, so that the level of dropped light to be monitored by the first monitoring section 100 is largely changed, thereby resulting in a possibility that the peak wavelength of dropped light cannot be accurately detected.

Figure 12:
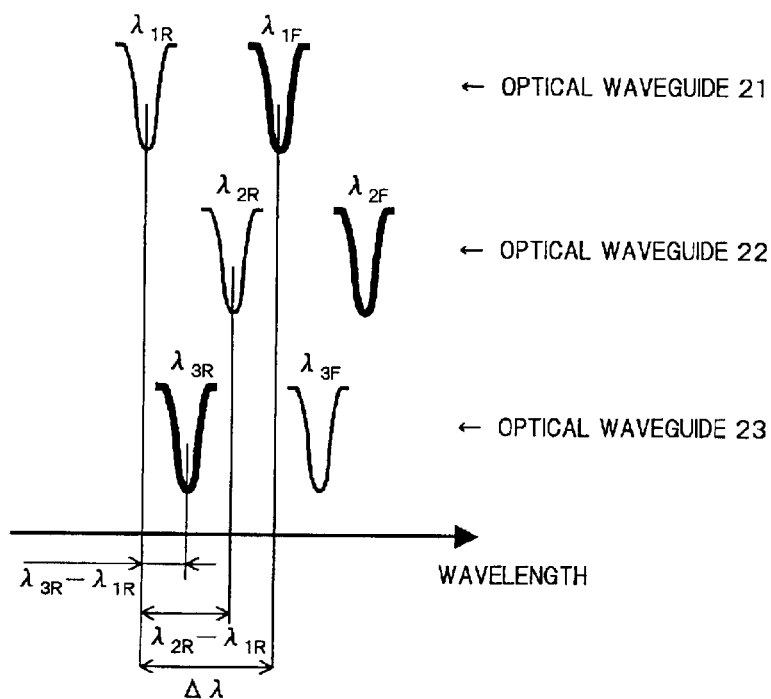
FIG. 12 is a diagram showing relationships among the selected wavelengths at respective stages set in the rejection type optical filter in FIG. 5.
Figure 13:
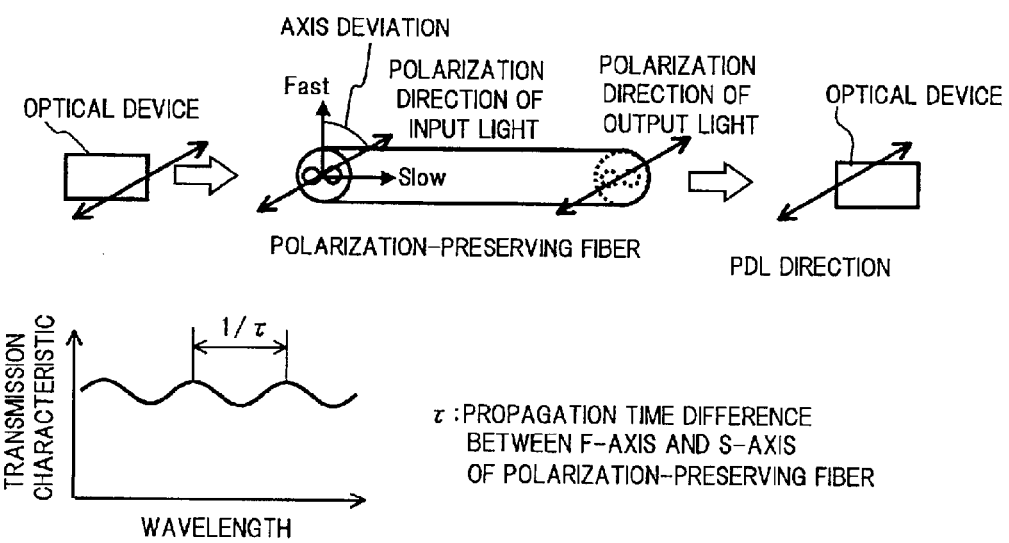
FIG. 13 is a diagram for explaining inter-polarization-mode interference of a polarization-preserving fiber.

In the constitution of FIG. 5, the setting of the blocked wavelengths (selected wavelength) corresponding to the optical waveguides 21 to 23 on the substrate 1 is indicated in the relationship as shown in FIG. 12. Therefore, for the light given to the substrate 1 via the connecting optical path $2_B$ and propagated sequentially through the optical waveguides 21, 23 and 22, the monitoring is performed on the dropped light in the optical waveguide 21 corresponding to the wavelength $\lambda_{1F}$ positioned substantially at the center of the blocking band, depending on the relationship of blocking wavelength as shown by a bold line in the figure. Moreover, for the light given to the substrate 1 via the connecting optical path $2_C$ and propagated sequentially through the optical waveguides 22, 23 and 21, the monitoring is performed on the dropped light in the optical waveguide 22 corresponding to the wavelength $\lambda_{2R}$, depending on the relationship of blocking wavelength as shown by a thin line in the figure.

Based on the peak wavelengths of dropped lights detected in the above manner, the wavelength deviation amount to the previously set control value (selected wavelength) is obtained based on the monitoring result by the second monitoring section 200, and a controlling signal for correcting the frequency of RF signal is generated according to the wavelength deviation amount, to be output to the RF signal generating circuit 40. Then, in the RF signal generating circuit 40, in accordance with the controlling signal from the RF signal controlling section 300, the frequency f of RF signal is corrected, and the corrected RF signal is applied commonly to the IDTs 41 to 43 at the respective stages. Thus, even if the filter characteristic is changed due to a change in temperature, deterioration with time lapse or the like, it becomes possible to block reliably and stably a light desired wavelength from passing through, by tracking and controlling the frequency of RF signal.

Further, in the present rejection type optical filter, at the starting time or at the alteration of setting, a process for previously detecting the control value of the AOTFs cascade loop connected on the substrate 1 is executed by the RF signal controlling section 300 based on the monitor signal M2 from the second monitoring section 200. In the second monitoring section 200, there is monitored the light passed through the monitoring AOTFs that operate in accordance with the same parameter as for the three staged AOTFs cascade connected on the substrate 1. That is, the branched light from the optical coupler 201 on the input optical path $2_{IN}$ is polarization split by the PBS 202. One of the polarization lights is given, as a TE mode light, to the PBS 231a on the optical waveguide 221 of the substrate 1 via the connecting optical path $2_G$, to be propagated within the optical waveguide 221 toward the PBS 231b. At this time, due to the acousto-optic effect of SAW generated at the IDT 241 and propagated through the SAW guide 251, only the light corresponding to the selected wavelength out of the TE mode light being propagated within the optical waveguide 221 is mode converted into a TM mode light. Then, when the respective mode lights reach the PBS 231b, the mode converted TM mode light of selective wavelength passes therethrough and is sent to the PBS 204 via the connecting optical path $2_I$.

On the contrary, the other polarization light polarization split by the PBS 202 is rotated with polarization plane thereof by 90 degrees by the polarization rotating section 203, and then given, as a TE mode light, to the PBS 232b on the optical waveguide 222 of the substrate 1 via the connecting optical path $2_H$, to be propagated within the optical waveguide 222 toward the PBS 232a. At this time, due to the acousto-optic effect of SAW generated at the IDT 242 and propagated through the SAW guide 252, only the light corresponding to the selected wavelength out of the TE mode light being propagated within the optical waveguide 222 is mode converted into a TM light. Then, when the respective mode lights reach the PBS 232a, the mode converted TM mode light of selective wavelength passes therethrough, and is rotated with polarization plane thereof by 90 degrees by the polarization rotating section 205 and then sent to the PBS 204 via the connecting optical path $2_J$.

In the PBS 204, the polarization lights with polarization planes being orthogonal to each other from the connecting optical paths $2_I$ and $2_J$, are multiplexed to be sent to the light receiver 206. In the light receiver 206, the monitor signal from the PBS 204 is converted into an electrical signal, to be output to the RF signal controlling section 300, as the monitor signal M2.

In the RF signal controlling section 300, at the starting time or at the alteration of setting, a controlling signal for sweeping the frequency of RF signal within a required range is generated, to be output to the RF signal generating circuit 40. Then, the wavelengths of lights actually selected by the monitoring AOTFs on the substrate 1 are detected based on the monitor signal M2 from the second monitoring section 200, corresponding to the RF signals of respective swept frequencies, and in accordance with the detection result, the RF signal frequency corresponding to a desired selected wavelength is judged to be initially set as a control value for the starting time or the time of alteration of setting.

The control value set based on the monitor signal M2 from the second monitoring section 200, is determined in accordance with the wavelengths of lights actually passed through the monitoring AOTFs that operate in accordance with the same control parameter (frequency of RF signal) for the AOTFs cascade connected that process the main signal light, and therefore, can achieve an extremely higher precision, compared with a value obtained by using a monitoring device that operates in accordance with a different control parameter. In the rejection type optical filter to be used for the OXC apparatus, OADM apparatus or the like, if the light of wavelength that is needed to pass through, is erroneously blocked, the services to the users are suspended. Therefore, the control parameter requires a high precision in the initial value thereof. Accordingly, it is very useful that the controlling function of RF signal based on the monitoring result by the second monitoring section 200 is provided in the rejection type optical filter.

As described above, according to the present rejection type filter, since the PBS 5 and the respective AOTFs cascade loop connected on the substrate 1 are connected to one another by the connecting optical paths $2_{13}$, $2_{23}$, $2_B$ and $2_C$ each having the cross-connecting section C, and also the respective portions constituting the first and second monitoring sections are connected by the connecting optical paths $2_D$, $2_E$, $2_G$ to $2_J$ each having the cross-connecting section C, respectively, the polarization lights passing through the respective connecting optical paths are propagated through two different polarization axes of the polarization-preserving fibers for substantially equal distances. Thus, even if the polarization directions of the lights to be sent to the respective connecting optical paths are not completely coincident with the polarization axes of the respective connecting optical paths, it becomes possible to suppress, simultaneously, the periodic wavelength dependence losses due to the inter-polarization-mode interference, and PMD caused in the connecting optical paths, and also PDLs in the AOTFs or the PBSs.

Note, in the above rejection type optical filter, as one example, the use of AOTF that polarization mode converts a required wavelength light by utilizing the acousto-optic effect has been described. However, it is possible to use, for example, an EOTF that polarization mode converts a required wavelength light by utilizing the electro-optic effect, instead of the AOTF. This EOTF is the one that arranges an electrode of predetermined shape along an optical waveguide formed on the substrate made of, such as, $LiNbO_3$, and performs polarization mode conversion of required wavelength light, due to the electro-optic effect based on an electric field generated by the application of a required voltage on the electrode.

What is claimed is:

1. A connecting method of optical devices, for connecting a plurality of optical devices, each of which has polarization dependence loss, with one another using an optical path having a polarization-preserving characteristic,
    wherein said optical devices are connected to one another by said optical path including optical characteristics in which a light is propagated along two different polarization axes for substantially equal distances and a periodic wavelength dependence loss caused by an inter-polarization-mode interference in the optical path is suppressed.

2. A connecting method of optical devices according to claim 1,
    wherein said optical devices are connected to one another by said optical path having, in the vicinity of the center thereof in a longitudinal direction, a cross-connecting section connected by rotating the polarization axis by substantially 90 degrees.

3. A connecting method of optical devices according to claim 1,
    wherein said optical devices are connected to one another by said optical path having, at predetermined positions in a longitudinal direction, a plurality of cross-connecting sections connected by rotating the polarization axes by substantially 90 degrees, respectively.

4. An optical apparatus comprising a plurality of optical devices, each of which has polarization dependence loss, connected to one another using an optical path having a polarization-preserving characteristic,
    wherein said optical path includes optical characteristics in which a light to be transmitted among the optical devices connected to one another is propagated along two different polarization axes for substantially equal distances and a periodic wavelength dependence loss caused by an inter-polarization-mode interference in the optical path is suppressed.

5. An optical apparatus according to claim 4,
    wherein said optical path has, in the vicinity of the center thereof in a longitudinal direction, a cross-connecting section connected by rotating the polarization axis by substantially 90 degrees.

6. An optical apparatus according to claim 4, wherein said optical path has, at predetermined positions in a longitudinal direction, a plurality of cross-connecting sections connected by rotating the polarization axes by substantially 90 degrees, respectively.

7. An optical apparatus according to claim 4, wherein said plurality of optical devices include an optical filter device.

8. An optical apparatus according to claim 7, wherein said optical filter device is an acousto-optic tunable filter (AOTF).

9. An optical apparatus according to claim 7, wherein said optical filter device is an electro-optic tunable filter (EOTF).

10. An optical apparatus according to claim 4, wherein said plurality of optical devices include a planar lightwave circuit (PLC).

11. A connecting method of optical devices according to claim 1, wherein the plurality of optical devices are formed on a same substrate.

12. A connecting method of optical devices according to claim 1, wherein a wavelength division multiplexed (WDM) light travels through the optical devices via the optical path.

13. A connecting method of optical devices according to claim 2, wherein the plurality of optical devices are formed on a same substrate.

14. A connecting method of optical devices according to claim 2, wherein a wavelength division multiplexed (WDM) light travels through the optical devices via the optical path.

15. A connecting method of optical devices according to claim 3, wherein the plurality of optical devices are formed on a same substrate.

16. A connecting method of optical devices according to claim 3, wherein a wavelength division multiplexed (WDM) light travels through the optical devices via the optical path.

17. An optical apparatus according to claim 4, further comprising;
a same substrate on which each of the plurality of optical devices are formed.

18. An optical apparatus according to claim 4, wherein a wavelength division multiplexed (WDM) light travels through the optical devices via the optical path.

19. An optical apparatus according to claim 5, further comprising:
a same substrate on which each of the plurality of optical devices are formed.

20. An optical apparatus according to claim 5, wherein a wavelength division multiplexed (WDM) light travels through the optical devices via the optical path.

21. An optical apparatus according to claim 6, further comprising:
a same substrate on which each of the plurality of optical devices are formed.

22. An optical apparatus according to claim 6, wherein a wavelength division multiplexed (WDM) light travels through the optical devices via the optical path.

23. An apparatus comprising:
an optical path having first and second ends;
a first optical device outputting a light to the first end of the optical path; and
a second optical device receiving the light output by the first optical device from the second end of the optical path, wherein
each of the first and second optical devices has polarization dependence loss, and
the optical path has optical characteristics so that light propagating through the optical path from the first end to the second end propagates along two different polarization axes for substantially equal distances along different portions of the optical path and so that polarization of the light is preserved from the first end to the second end, while a periodic wavelength dependence loss caused by an inter-polarization-mode interference in the optical path is suppressed.

24. An apparatus as in claim 23, further comprising:
a same substrate on which the first and second optical devices are formed.

25. An apparatus as in claim 24, wherein the optical path is not formed on the substrate.

26. An apparatus as in claim 23, wherein the light output from the first optical device is a wavelength division multiplexed (WDM) light.

27. An apparatus as in claim 24, wherein the light output from the first optical device is a wavelength division multiplexed (WDM) light.

28. An apparatus as in claim 25, wherein the light output from the first optical device is a wavelength division multiplexed (WDM) light.

29. An apparatus as in claim 23, wherein each of the first and second optical devices is one of an optical filter, an acousto-optic tunable filter (AOTF), an electro-optic tunable filter (EOTF) and a planar lightwave circuit (PLC).

30. An apparatus as in claim 24, wherein each of the first and second optical devices is one of an optical filter, an acousto-optic tunable filter (AOTF), an electro-optic tunable filter (EOTF) and a planar lightwave circuit (PLC).

31. An apparatus comprising:
a substrate;
an optical path, not formed on the substrate, having first and second ends;
a first optical device, having a polarization dependence loss, formed on the substrate, outputting a wavelength division multiplexed (WDM) light to the first end of the optical path; and
a second optical device, having a polarization dependence loss, receiving the WDM light output by the first optical device from the second end of the optical path, the second optical device being formed on the substrate so that the first and second optical devices are thereby formed on the same substrate, wherein the optical path has optical characteristics so that the WDM light propagates through the optical path from the first end to the second end along two different polarization axes for substantially equal distances along different portions of the optical path and so that polarization of the WDM light is preserved from the first end to the second end and a periodic wavelength dependence loss caused by an inter-polarization-mode interference in the optical path is suppressed.

32. An apparatus as in claim 31, wherein each of the first and second optical devices is one of an optical filter, an acousto-optic tunable filter (AOTF), an electro-optic tunable filter (EOTF) and a planar lightwave circuit (PLC).

33. A method comprising:
providing an optical path having first and second ends;
providing a first optical device, having a polarization dependence loss, outputting a light to the first end of the optical path; and
providing a second optical device, having a polarization dependence loss, receiving the light output by the first optical device from the second end of the optical path, wherein the provided optical path has optical characteristics so that light propagating through the optical path from the first end to the second end propagates along two different polarization axes for substantially equal distances along different portions of the optical path and so that polarization of the light is preserved from the first end to the second end and a periodic wavelength dependence loss caused by an inter-polarization-mode interference in the optical path is suppressed.

34. An apparatus comprising:

means for providing an optical path having first and second ends;

means for providing a first optical device, having a polarization dependence loss, outputting a light to the first end of the optical path; and means for providing a second optical device, having a polarization dependence loss, receiving the light output by the first optical device from the second end of the optical path, wherein the optical path has optical characteristics so that light propagating through the optical path from the first end to the second end propagates along two different polarization axes for substantially equal distances along different portions of the optical path and so that polarization of the light is preserved from the first end to the second end and a periodic wavelength dependence loss caused by an inter-polarization-mode interference in the optical path is suppressed.

35. An apparatus comprising:

an optical path having first and second ends;

a first optical device, having a polarization dependence loss, outputting a light to the first end of the optical path; and a second optical device, having a polarization dependence loss, receiving the light output by the first optical device from the second end of the optical path, wherein the optical path has optical characteristics so that polarization of the light is preserved from the first end to the second end, and so that light propagating through the optical path from the first end to the second end propagates along a first polarization axes for a first distance along the optical path and propagates along a second polarization axes for a second distance along the optical path, the first and second distances being equal to each other and not overlapping along the optical path, and a periodic wavelength dependence loss caused by an inter-polarization-mode interference in the optical path is suppressed.

36. An apparatus as in claim 35, further comprising:

a cross-connecting section rotating the polarization of light propagating through the optical path from the first polarization axes to the second polarization axis, the cross-connecting section be located at a mid-point of the optical path so that the first and second distances are equal to each other and do not overlap along the optical path.

37. A connecting method of optical devices, for connecting a plurality of optical devices with one another using an optical path having a polarization-preserving characteristic, wherein said optical devices are connected to one another by said optical path including optical characteristics in which a light is propagated along two different polarization axes for substantially equal distances, and said optical devices are connected to one another by said optical path having, at predetermined positions in a longitudinal direction, a plurality of cross-connecting sections connected by rotating the polarization axes by substantially 90 degrees, respectively.

38. An optical apparatus comprising a plurality of optical devices connected to one another using an optical path having a polarization-preserving characteristic, wherein said optical path includes optical characteristics in which a light to be transmitted among the optical devices connected to one another is propagated along two different polarization axes for substantially equal distances, and said optical path has, at predetermined positions in a longitudinal direction, a plurality of cross-connecting sections connected by rotating the polarization axes by substantially 90 degrees, respectively.

39. A connecting method of optical devices according to claim 37, wherein the plurality of optical devices are formed on a same substrate.

40. A connecting method of optical devices according to claim 37, wherein a wavelength division multiplexed (WDM) light travels through the optical devices via the optical path.

41. An optical apparatus according to claim 38, further comprising:

a same substrate on which each of the plurality of optical devices are formed.

42. An optical apparatus according to claim 38, wherein a wavelength division multiplexed (WDM) light travels through the optical devices via the optical path.

* * * * *